(12) United States Patent
Wilson et al.

(10) Patent No.: US 8,374,976 B2
(45) Date of Patent: Feb. 12, 2013

(54) METHOD FOR SELECTING NEIGHBORHOODS OF TRAINING POINTS FOR LOCAL LEARNING

(75) Inventors: Kevin W. Wilson, Cambridge, MA (US); Xiaoqian Jiang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 573 days.

(21) Appl. No.: 12/631,590

(22) Filed: Dec. 4, 2009

(65) Prior Publication Data
US 2011/0137829 A1 Jun. 9, 2011

(51) Int. Cl.
*G06F 15/18* (2006.01)
(52) U.S. Cl. .................................................. 706/12
(58) Field of Classification Search .................... None
See application file for complete search history.

(56) References Cited

PUBLICATIONS

Mitra, P.; Murthy, C.A.; Pal, S.K.; , "Unsupervised feature selection using feature similarity," Pattern Analysis and Machine Intelligence, IEEE Transactions on , vol. 24, No. 3, pp. 301-312, Mar. 2002.*

Li, Yun; Hu, Su-Jun; Yang, Wen-Jie; Sun, Guo-Zi; Yao, Fang-Wu; Yang, Geng. "Similarity-Based Feature Selection for Learning from Examples with Continuous Values," Advances in Knowledge Discovery and Data Mining Lecture Notes in Computer Sciencepp. 957-964 (2009).*

Hastie, T.; Tibshirani, R.; , "Discriminant adaptive nearest neighbor classification," Pattern Analysis and Machine Intelligence, IEEE Transactions on , vol. 18, No. 6, pp. 607-616, Jun. 1996.*

S. Basu, C.A. Micchelli, and P. Olsen, "Maximum Entropy and Maximum Likelihood Criteria for Feature Selection from Multivariate Data," Proc. IEEE Int'l. Symp. Circuits and Systems, pp. III-267-270, 2000.*

J. Friedman, "Flexible Metric Nearest Neighbour Classification," technical report, Stanford Univ., Nov. 1994.*

\* cited by examiner

*Primary Examiner* — Kakali Chaki
*Assistant Examiner* — Daniel Pellett
(74) *Attorney, Agent, or Firm* — Gene Vinokur; Dirk Brinkman

(57) ABSTRACT

A method selects a subset of training points near a query point from a set of training points. The subset of training points near the query point is determined from a the set of training points such that a cumulative similarity is maximized, wherein the cumulative similarity measures a similarity of the query point to each point in the subset and a similarity of points in the subset to each other.

5 Claims, 3 Drawing Sheets

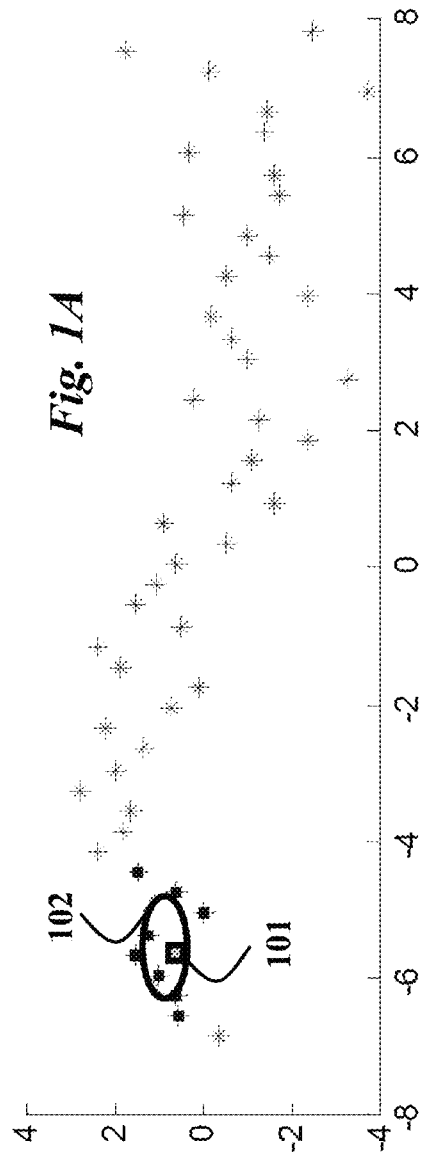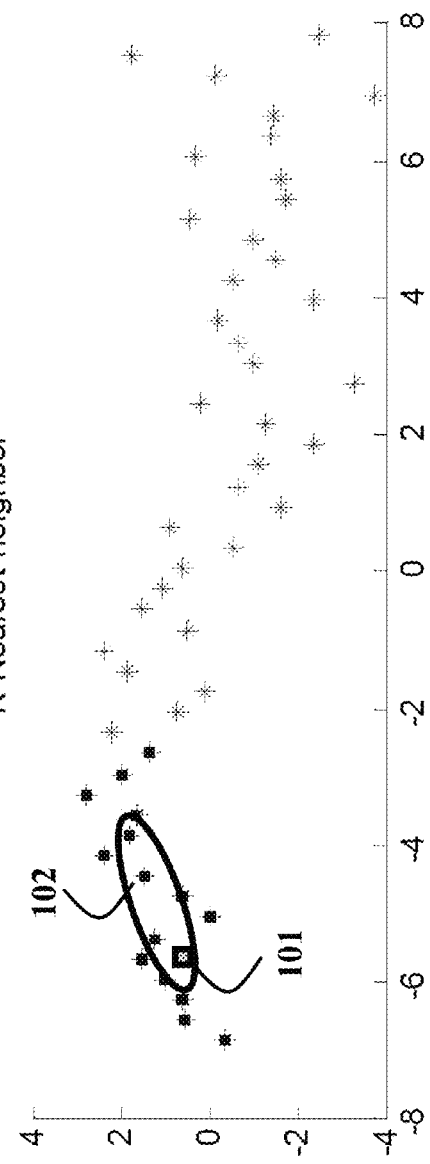

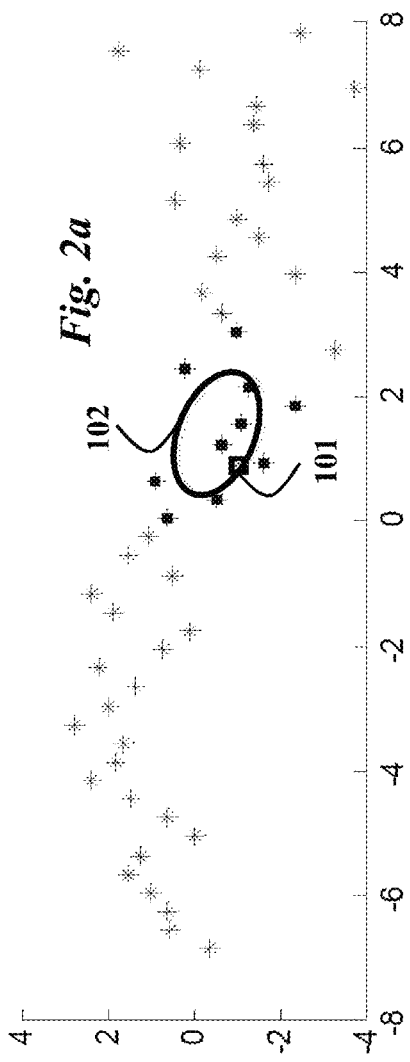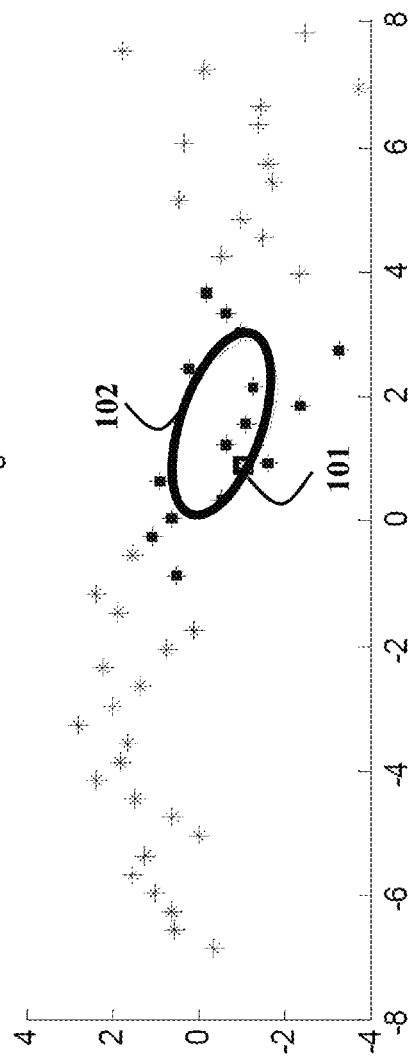

METHOD FOR SELECTING NEIGHBORHOODS OF TRAINING POINTS FOR LOCAL LEARNING

FIELD OF THE INVENTION

The invention relates generally to local supervised learning, and more particularly to selecting a subset of training points from a training data set based on a single query point.

BACKGROUND OF THE INVENTION

In supervised learning, training data are used to estimate a function that predicts an unknown output based on an input vector of query points. In local learning methods, for a given query point, the function is determined by training points that are "near" the query point. Nearness can be determined by some distance metric.

Examples of local learning methods include nearest-neighbor regression and classification, and locally weighted regression. Two example applications include prediction of future values of a time series based on past values, and detection of whether a particular object is present in an image based on pixel values.

In such problems, the training data set D is a set of pairs $D = \{(x_1, y_1), \ldots, (x_M, y_M)\} \subset \mathcal{X} \times \mathcal{R}_s$, where X denotes input patterns, e.g., $\mathcal{X} = \mathcal{R}^d$. Each pair includes an input vector $x_i$, and an output $y_i$. A function $\hat{y} = F(x)$, which estimates the output from the corresponding input vector is learned from the training data set.

In local learning methods, for each query point $x_q$, the local function $F(x)$ is learned based on only the training data points in the training set that are near the input query point $x_q$. The training points that are near the query point are usually selected from the k nearest points in the training dataset according to the distance metric. Alternatively, the selected training points are less than some distance threshold d from the query point.

The idea the behind local learning methods is that the data can have different characteristics in different parts of the input space, and data that are close to the query point should be the most useful for learning the function to predict the desired output from the given input.

In an example application, it is desired to predict the daily power demand. Different factors can influence the demand load at different times of the year. If the query point corresponds to a summer day, then it can be advantageous to learn a function F( ) based on only the summer days in the training data set.

However, using the k nearest neighbors or all neighbors within some distance d does not always give the best performance.

It is desired to provide a new notion of the local neighborhood along with a method for determining which training points belong to this neighborhood.

SUMMARY OF THE INVENTION

A method selects a subset of training points near a query point from a set of training points by maximizing a cumulative similarity, wherein the cumulative similarity measures a similarity of the query point to each point in the subset and a similarity of points in the subset to each other.

BRIEF DESCRIPTION OF THE DRAWINGS

FIGS. 1A and 2A are plots of training data and subsets of training data selected by the method according to the embodiments of the invention;

FIGS. 1B and 2B are plots of training data and subsets of training data selected by prior art methods.

DETAILED DESCRIPTION OF THE PREFERRED EMBODIMENTS

Figure 3:
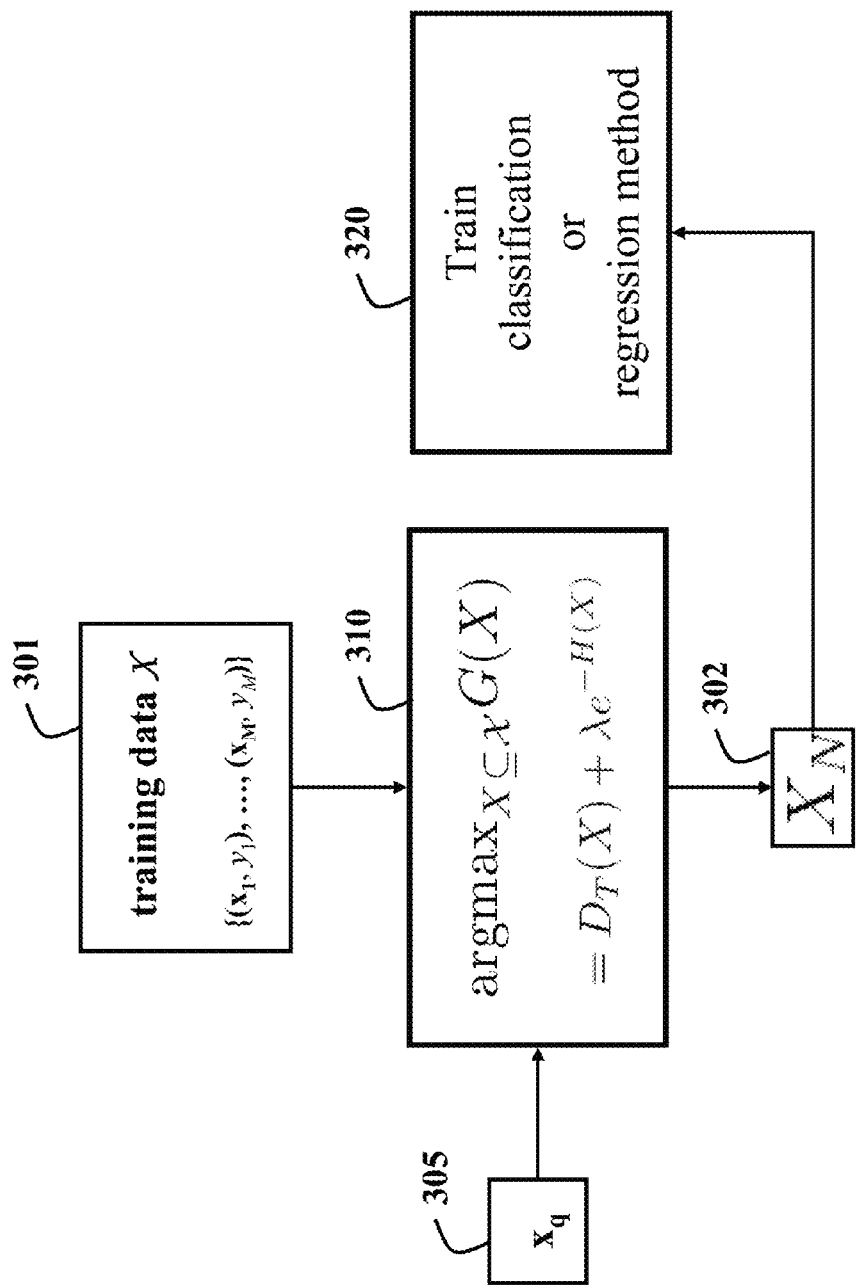
FIG. 3 is a flow diagram of the method for selecting training data according to embodiments of the invention.

As shown in FIG. 3, the embodiments of our invention provide a method for selecting a local neighborhood of points $X_N$ 302 that is near to a single input query point $x_q$ 305. It is desired that the all of the neighborhood points are compact. As defined herein, the set is compact if the points are relatively near each other according to some distance metric. The steps of the method can be performed in a processor including memory and input/output interfaces as known in the art.

Conventional nearest-neighbor methods select neighborhood points that are near to the query point without regard for whether the resulting neighborhood is compact.

The method according to the embodiments of the invention includes a compactness criterion to improve performance when the input training data are non-uniformly distributed in the input space.

Our subset of local neighborhood points $X_N$ 302 is $$X_N = \mathrm{argmax}_{X \subset \chi} G(X) = D_T(X) + \lambda e^{-H(X)}, \lambda > 0, \tag{1}$$

where the function argmax 310 returns the value of the parameter X that maximizes the function G, $D_T(X) = \Sigma_{x \in X} \exp(-\|x - x_q\|_p)$, $p = 1, 2$ is a cumulative similarity from the query point 305 to the training subset $X \subset \chi$, $e^{-H(X)}$ evaluates an inverse range of a distribution induced by X, and γ is a control parameter. By the "range" of a distribution, we mean the number of points in the sample space if the sample space is discrete, and the length of the interval on which the probability density function is different from zero if the sample space is a real line according to the properties of exponential entropy. H is the Shannon entropy. The Shannon entropy is a measure of average information content that is missing when the value of the random variable is unknown.

We estimate the Shannon entropy assuming a Gaussian distribution as follows $$H(N(\mu, \Sigma)) = \frac{1}{2} \log|\Sigma| + \frac{C}{2} (\log 2\pi e), \tag{2}$$

where μ is the mean of the points in the subset, and Σ is their covariance. C is the dimensionality of the input training points 301.

The goal of Equation (1) is to maximize the cumulative similarity to the largest cluster in the vicinity of a query point. Our objective is to find the subset of the training data 302 in a way that is adaptive to the underlying structure of the training data patterns.

The combinatorial optimization nature of this problem is a key difference from a greedy approach used in conventional nearest-neighbors methods. The objective function defined in Equation (1), which we maximize, has a mathematical property known as supermodularity. A function $$f: R^k \to R$$

is supermodular if $$f(x \vee y) + f(x \wedge y) \geq f(x) + f(y)$$

for all x, $y \in R^k$, where $x \vee y$ denotes the component-wise maximum, and $x \wedge y$ the component-wise minimum of x and y.

Maximizing the supermodular function is equivalent to minimizing a submodular function. Therefore, we can apply the conventional tools of submodular optimization to optimize this function.

After the optimal subset of points is determine using the above procedure, the subset of points can be used to train 320 any classification or regression method.

Using FIGS. 1 and 2, we describe two simple examples, and compare our submodular model selection method with the conventional k nearest-neighbor selection method, for k=15. The Figures show the single query points 101 and the subsets 102. In the Figures, a hundred synthetic input data points $x_i$ are uniformly spaced in an interval $[-8, 8]$, and target output data points $y_i=2 \sin(2\pi x)$ are corrupted with Gaussian noise having a standard deviation that increases linearly from 0.5 at x=0 to 1.5 at x=1.

The Figures clearly show that our method outperforms the conventional method. In the submodular method, the neighborhood points are selected adaptively, with a smaller number at the head of the distribution in FIGS. 1A-1B, and a larger number closer to the tail in FIGS. 2A-2B, which matches the increasing corruption of Gaussian noise in our examples.

Heteroscedastic Support Vector Regression

The neighborhood training data selected as described above can be used to train any regression or classification method. We now describe one such technique for heteroscedastic support vector regression, which is an extension of support vector regression that uses local neighborhoods to find local regression functions. In statistics, a sequence of random variables is heteroscedastic when the random variables have different variances.

Heteroscedastic support vector regression estimates a function F(x) of the form $$F(x) = w^T x + b,$$

where $w^T$ is a vector with a transpose operator T, and b is a scalar.

The function is found by solving the following optimization problem:

$$\min_{w,b,\epsilon,\xi,\xi^*} \frac{1}{2N} \sum_{i=1}^{N} w^T (2NI + \Sigma_i) w + C \sum_{i=1}^{N} (\xi_i + \xi_i^* + \epsilon)^p \quad (3)$$

$$\text{s.t.} \quad y_i - (w^T x_i + b) \leq \epsilon + \xi_i^*$$

$$(w^T x_i + b) - y_i \leq \epsilon + \xi_i$$

$$\xi_i^*, \xi_i \geq 0, \forall i,$$

where I is an N×N identity matrix, N is the dimensionality of the input vector, $\xi_i$ and $\xi_i^*$ are slack variables, $\epsilon$ is an error tolerance, and $p \in \{1, 2\}$ determines the penalty type, and $$\Sigma_i = \frac{1}{k_i + 1} \sum_{x \in X_i} (x - \bar{x}_i)(x - \bar{x}_i)^T$$

is an empirical covariance for the training points in the neighborhood of $x_i$, where $X_i$ is the subset of the neighborhood points, $k_i$ is the number of points in $X_i$, and $\bar{x}_i$ is the mean of these neighborhood points. This neighborhood of points can be selected using the submodular optimization technique described above.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting a subset of training points near a query point from a set of training points for local learning, comprising the steps of:
   providing a set of training points $\chi$, a query point $x_q$;
   determining a subset of training points $X_N$ near the query point $x_q$ from a set of training points $\chi$ according to
   $$\text{argmax}_{X \subset \chi} G(X) = D_T(X) + \lambda e^{-H(X)},$$
   where the function argmax returns a value of X that maximizes the function G
   $$D_T(X) = \Sigma_{x \in X} \exp(-\|x - x_q\|_p) \text{ for } p=1,2 \text{ is a}$$
   cumulative similarity from the query point to the subset of training points $X_n$, $e^{-H(X)}$ evaluates an inverse range of distribution induced by X and $\gamma$ is a control parameter greater than zero, and H is a Shannon entropy, wherein the providing and determining are performed in a processor.

2. The method of claim 1, further comprising:
   estimating the Shannon entropy according to
   $$H(N(\mu, \Sigma)) = \frac{1}{2} \log|\Sigma| + \frac{C}{2} (\log 2\pi e),$$
   where $\mu$ is a mean of the training points in the subset $X_N$, and $\Sigma$ is a covariance of the training points in the subset $X_N$, and C is a dimensionality of the set of training points.

3. The method of claim 1, further comprising:
   training a classification method using the subset of training points $X_N$.

4. The method of claim 1, further comprising:
   training a regression method using the subset of training points $X_N$.

5. The method of claim 4, further comprising:
   using heteroscedastic support vector regression as the regression method.

\* \* \* \* \*